United States Patent
Kloeppel et al.

(10) Patent No.: US 7,922,479 B2
(45) Date of Patent: Apr. 12, 2011

(54) MODULAR INJECTION MOLDING HOT RUNNER SYSTEM

(75) Inventors: Glen R. Kloeppel, Columbia, MO (US); Claudio A. Grubicy, Columbia, MO (US); Timothy C. Moritz, Columbia, MO (US); Margo E. Bubb, Peoria, IL (US); Brenda S. Spell, Columbia, MO (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 12/165,229

(22) Filed: Jun. 30, 2008

(65) Prior Publication Data
US 2009/0324771 A1 Dec. 31, 2009

(51) Int. Cl.
*B29C 45/22* (2006.01)
(52) U.S. Cl. ..................... 425/572
(58) Field of Classification Search .................. 425/572, 425/574, 575, 576, 542, 549
See application file for complete search history.

(56) References Cited

U.S. PATENT DOCUMENTS

| | | | |
|---|---|---|---|
| 4,161,386 A | 7/1979 | Osuna-Diaz | |
| 4,266,723 A | 5/1981 | Osuna-Diaz | |
| 5,028,226 A | 7/1991 | De'ath et al. | |
| 5,030,084 A * | 7/1991 | Gellert et al. | 425/549 |
| 5,879,727 A | 3/1999 | Puri | |
| 6,638,049 B1 | 10/2003 | Moss et al. | |
| 6,764,297 B2 | 7/2004 | Godwin et al. | |
| 7,364,426 B2 * | 4/2008 | Feick et al. | 425/564 |
| 2004/0191358 A1 | 9/2004 | Gellert et al. | |
| 2005/0225000 A1 | 10/2005 | Tabassi | |
| 2006/0269649 A1 | 11/2006 | Ciccone | |
| 2007/0104824 A1 | 5/2007 | Blundy | |
| 2007/0119990 A1 | 5/2007 | Feick et al. | |
| 2007/0124907 A1 | 6/2007 | Russegger et al. | |

* cited by examiner

*Primary Examiner* — Tim Heitbrink
(74) *Attorney, Agent, or Firm* — Leydig, Voit & Mayer

(57) ABSTRACT

An injection molding hot runner system of modular construction adapted for rapid removal and replacement during required maintenance. The system includes at least one hot runner module adapted for mounting at a support surface. The hot runner module includes one or more injection nozzles adapted for fluid communication with a supply of molten material and an arrangement of acceptance openings adapted to engage mounting projection elements extending away from the support surface.

17 Claims, 4 Drawing Sheets

MODULAR INJECTION MOLDING HOT RUNNER SYSTEM

TECHNICAL FIELD

This patent disclosure relates generally to injection molding systems and, more particularly, to an injection molding system incorporating one or more modular hot runner systems.

BACKGROUND

Injection molding systems incorporating so-called "hot runners" for distribution of molten thermoplastic material to one or more injection nozzles are generally known. In a typical hot runner system, the injection nozzles project away from a face of the hot runner system for insertion into a splittable mold formed by a first mold plate referred to as the core plate and a second mold plated referred to as the cavity plate such that the tip of the injection nozzle projects into a mold cavity formed between the mold plate and the cavity plate. Injection of thermoplastic material into this cavity causes a part to be formed conforming generally to the contours of the cavity. Upon separating the mold plate from the cavity plate, the cavity is exposed and the formed, solidified part may be withdrawn. Of course, numerous variations to this basic process may be utilized as desired.

Regardless of the final arrangement of the hot runner system and associated mold, it may be necessary to periodically service the injection nozzles and supporting equipment within the hot runner system. In previous systems, the hot runner generally has been integrally constructed with the molten material feed system and has not been readily susceptible to rapid replacement. Thus, any maintenance required on the hot runner system has necessitated the removal of the mold plates followed by the on-site repair of the hot runner system. Such on-site repair removes the injection molding machine from use until the repair is fully completed. Specifically, repairing the hot runner system within the injection molding machine may result in the injection molding machine being out of operation for a period of several days while the repairs are taking place. This period of lost service may correlate to a substantial financial loss as parts cannot be manufactured during that time.

By way of example only, and not limitation, one prior system that may be used to provide access to a hot runner system is illustrated and described in U.S. Patent Application Publication US2006/0269649 A1, having a publication date of Nov. 30, 2006. As best understood, in the process disclosed in this reference, the mold plates are closed together and secured so as to form a unitary mold module. The mold plates are thereafter released from the hot runner system manifold plate and the mold module is pulled away from the runner and lifted out of place, thereby exposing the hot runner system for access during a repair. However, as best understood, there is no mechanism provided for removal of the complex hot runner system. Rather, the hot runner system may be required to remain in place during the entire period of repair, thereby rendering the entire injection molding system inoperable during that period.

SUMMARY

The present disclosure describes in one aspect an injection molding hot runner system of modular construction adapted for rapid removal and replacement during required maintenance. The hot runner system may include a support frame including mounting projection elements extending away from a support surface. The system may also include at least one hot runner module adapted for mounting at the support surface. The hot runner module includes one or more injection nozzles adapted for fluid communication with a supply of molten material and an arrangement of acceptance openings adapted to engage the mounting projection elements such that the mounting projection elements extend at least partially across the hot runner module.

DETAILED DESCRIPTION

Figure 1:
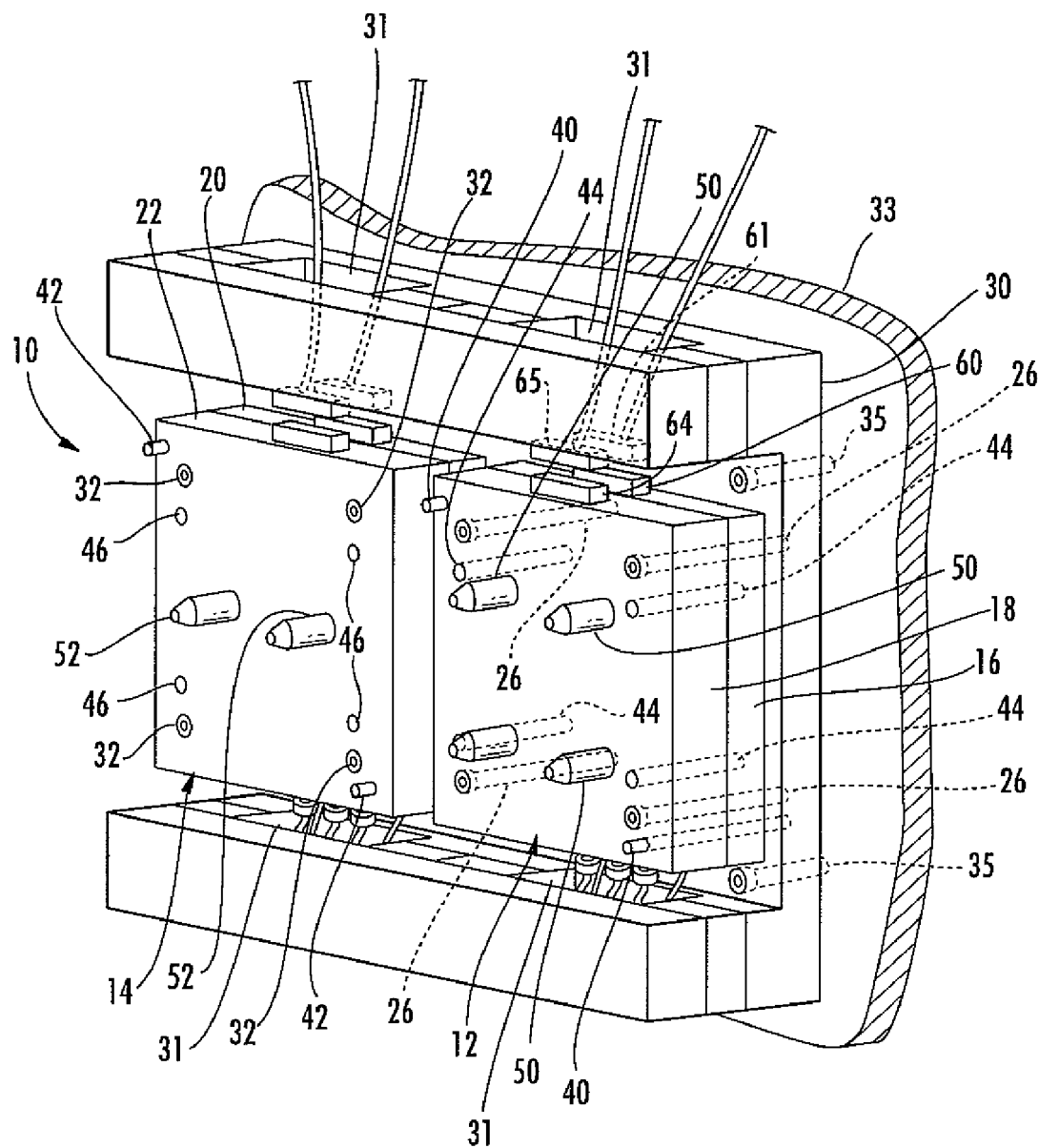
FIG. 1 is a diagrammatic perspective view of an exemplary hot runner system incorporating a pair of hot runner modules mounted within a support frame.

This disclosure relates to a hot runner system adapted for use in an injection molding process. The hot runner system includes one or more hot runner modules incorporating outwardly projecting injection nozzles adapted to inject molten material into a mold cavity. The hot runner modules are displaceable relative to a support structure to facilitate removal and replacement. An exemplary embodiment of a hot runner system incorporating hot runner modules adapted for rapid removal and replacement will now be described through reference to the various drawings wherein, to the extent possible, like elements are designated by like reference numerals in the various views.

Turning now to the figures, in FIG. 1, there is illustrated a hot runner system 10 for use in an injection molder. In the illustrated construction, the hot runner system 10 includes a first hot runner module 12 and a second hot runner module 14. However, such an arrangement is exemplary only and it is contemplated that a greater or lesser number of hot runner modules may be utilized as desired. Likewise, while the hot runner modules are illustrated as having a generally square shape, it is contemplated that virtually any other shape as may be desired may be utilized.

As shown, the first hot runner module 12 includes a first hydraulic plate 16 and a first manifold plate 18. The second hot runner module 14 includes a second hydraulic plate 20 and a second manifold plate 22. The first hot runner module 12 is secured in place by an arrangement of first module attachment members 26 such as bolts or the like extending from the first manifold plate 18 to an inner wall of a generally "C" shaped support frame 30. In the exemplary construction the support frame 30 may include an arrangement of frame openings 31 in the form of passages adapted for receipt of facilities lines, such as electrical and hydraulic supply lines, as will be discussed further hereinafter. As shown, in the illustrated construction, the second hot runner module 14 is secured in place by arrangement of second module attachment members 32 such as bolts or the like extending from the second manifold plate 22 to an inner wall of the support frame 30. In the illustrated exemplary construction, the support frame 30 may be mounted at a carrier plate 33 by frame attachment bolts 35 or other appropriate connecting structures. As illustrated, the first module attachment members 26 and the second module attachment members 32 may be held in sunken relation across the outwardly projecting face of the first manifold plate 18 and the second manifold plate 22. Such sunken insertion facilitates the ability of the first manifold plate 18 and the second manifold plate 22 to seat against outer surfaces of mold structures during an injection molding operation as will be described further hereinafter.

In the illustrated exemplary embodiment, the first hot runner module 12 engages a pair of first mounting projection elements 40, such as mounting pins or the like, which project away from an inner wall of the support frame 30. In such an arrangement, the first mounting projection elements 40 may slidingly engage openings at diametrically opposed corners of the first hot runner module 12. Likewise, a pair of second mounting projection elements 42, such as mounting pins or the like, project away from the inner wall of the support frame 30 to slidingly engage openings at diametrically opposed corners of the second hot runner module 14. The first mounting projection elements 40 and the second mounting projection elements 42 may be fixedly or removeably attached at the support frame 30 and may be adapted to support the weight of the first hot runner module 12 and the second hot runner module 14, respectively. According to one contemplated construction, the first mounting projection elements 40 and the second mounting projection elements 42 may be substantially smooth surface pins adapted to facilitate sliding engagement with the first hot runner module 12 and the second hot runner module 14. However, other configurations may likewise be utilized if desired.

According to the illustrated construction, the first hot runner module 12 may also include an arrangement of first module connection bores 44 running from the first manifold plate 18 into the first hydraulic plate 16. Likewise, the second hot runner module 14 may include an arrangement of second module connection bores 46 running from the second manifold plate 22 into the second hydraulic plate 20. The inclusion of the first module connection bores 44 and the second module connection bores 46 may permit the insertion of bolts or other connecting structures to hold the first manifold plate 18 to the first hydraulic plate 16 and the second manifold plate 22 to the second hydraulic plate 20 during withdrawal from the support frame 30 in a manner as will be described further hereinafter. In another arrangement, the first manifold plate 18 the second manifold plate 22 may be held to the first hydraulic plate 16 and the second hydraulic plate 20, respectively, by other connections such as bolts or the like coming from the rear. Of course, combinations of various connection systems may likewise be used as desired.

Figure 2:
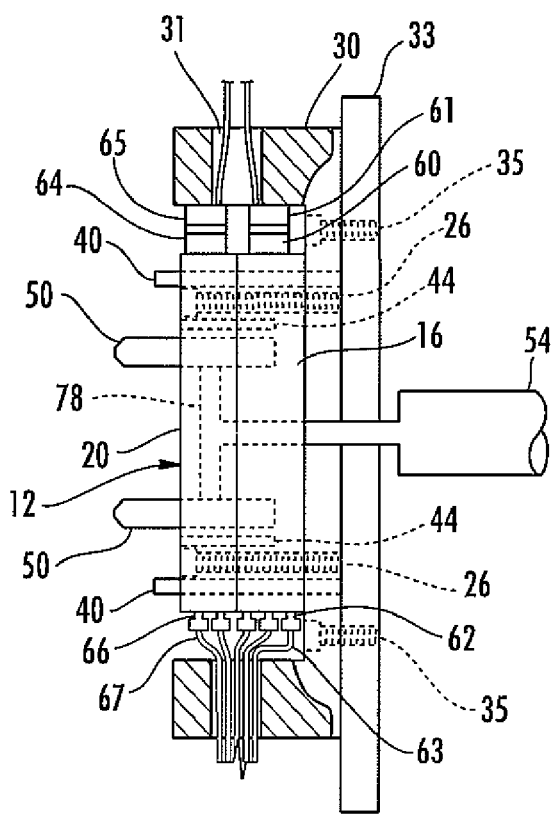
FIG. 2 is a diagrammatic side view of the hot runner system illustrated in FIG. 1.

As illustrated through joint reference to FIGS. 1 and 2, the first hot runner module 12 includes an arrangement of first injection nozzles 50 projecting outwardly across the first manifold plate 18. Likewise, the second hot runner module 14 includes an arrangement of second injection nozzles 52 arranged to project away from the second manifold plate 22. The number and pattern of the first injection nozzles 50 and the second injection nozzles 52 may be either similar or dissimilar depending on the actual molding operation being carried out. In the exemplary arrangement, the first injection nozzles 50 are in fluid communication with a first polymer supply 54 such as a force feed extruder or the like. Likewise, the second injection nozzles 52 are in fluid communication with a second polymer supply (not shown), which may be the same or different from the first polymer supply 54.

Figure 5:
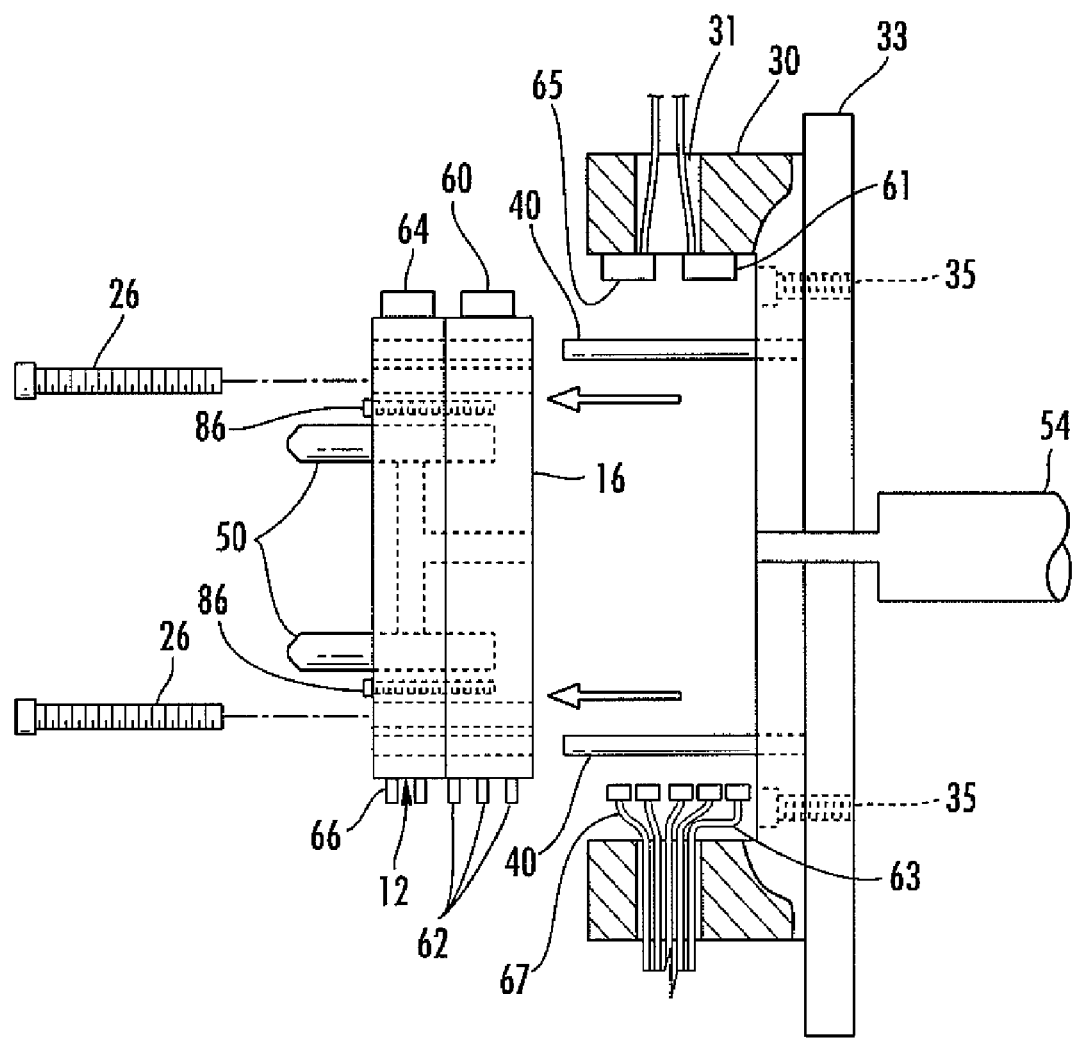
FIG. 5 is an exploded diagrammatic side view similar to FIG. 2, illustrating a hot runner module in displaced relation relative to the support frame.

In operation, the first injection nozzles 50 may be opened and closed by hydraulic actuators (not shown) within the first hydraulic plate 16. Likewise, the second injection nozzles 52 may be opened and closed by hydraulic actuators (not shown) within the second hydraulic plate 20. The first hydraulic plate 16 may include a set of first electrical connections 60 adapted for operative connection to a first electrical supply 61. The first hydraulic plate 16 may also include a set of first hydraulic input ports 62 adapted for operative connection to a set of first hydraulic supply lines 63 using so called "quick connector" attachments. The first manifold plate 18 may likewise include a set of second electrical connections 64 adapted for operative connection to a second electrical supply 65 and a set of second hydraulic input ports 66 adapted for operative connection to a set of second hydraulic supply lines 67 such as cooling water lines or the like using quick connector attachments. A similar power and hydraulic connection arrangement may also be used at the second hydraulic plate 20 and the second manifold plate 22. As best illustrated in FIG. 5, such an arrangement permits all of the electrical connections and hydraulic connections to be rapidly disconnected, thereby isolating the hot runner modules to permit their removal and replacement as required.

Figure 3:
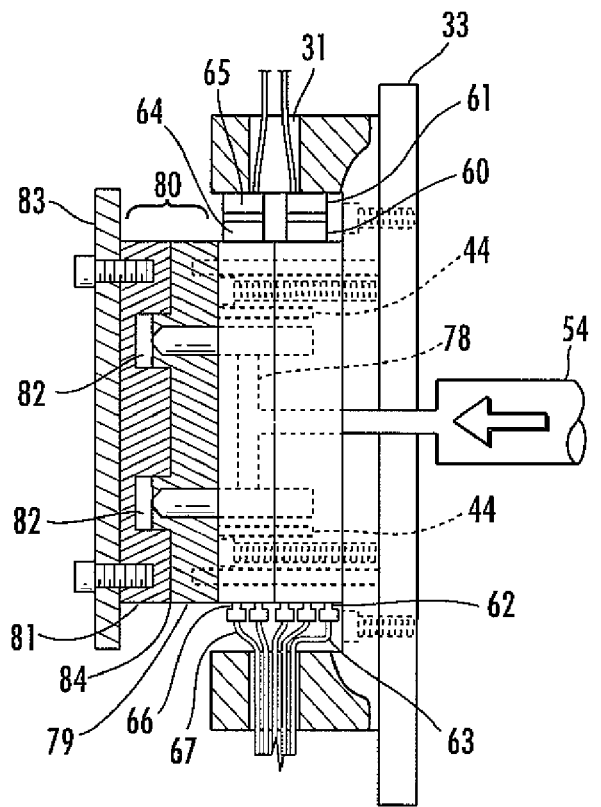
FIG. 3 is a diagrammatic side view similar to FIG. 2, showing a splittable mold module in place adjacent a hot runner module.

Referring to FIG. 3, a typical injection molding operation is illustrated in reference to the first hot runner module 12. It will be appreciated that the operation of the second hot runner module 14 may be carried out in a similar manner. In this regard, according to one exemplary practice, the first hot runner module 12 and the second hot runner module 14 may be operated independently or in conjunction with one another. By way of example only, and not limitation, the first hot runner module 12 and the second hot runner module 14 may be operated in conjunction to produce a common part by placing a mold in operative engagement with the first injection nozzles 50 for injection of a first polymer and subsequently rotating or otherwise moving at least a portion of the mold into operative relation with the second hot runner module 14 for injection of a second polymer using second injection nozzles 52. Of course, such multiple source polymer injection is discretionary only.

Figure 4:
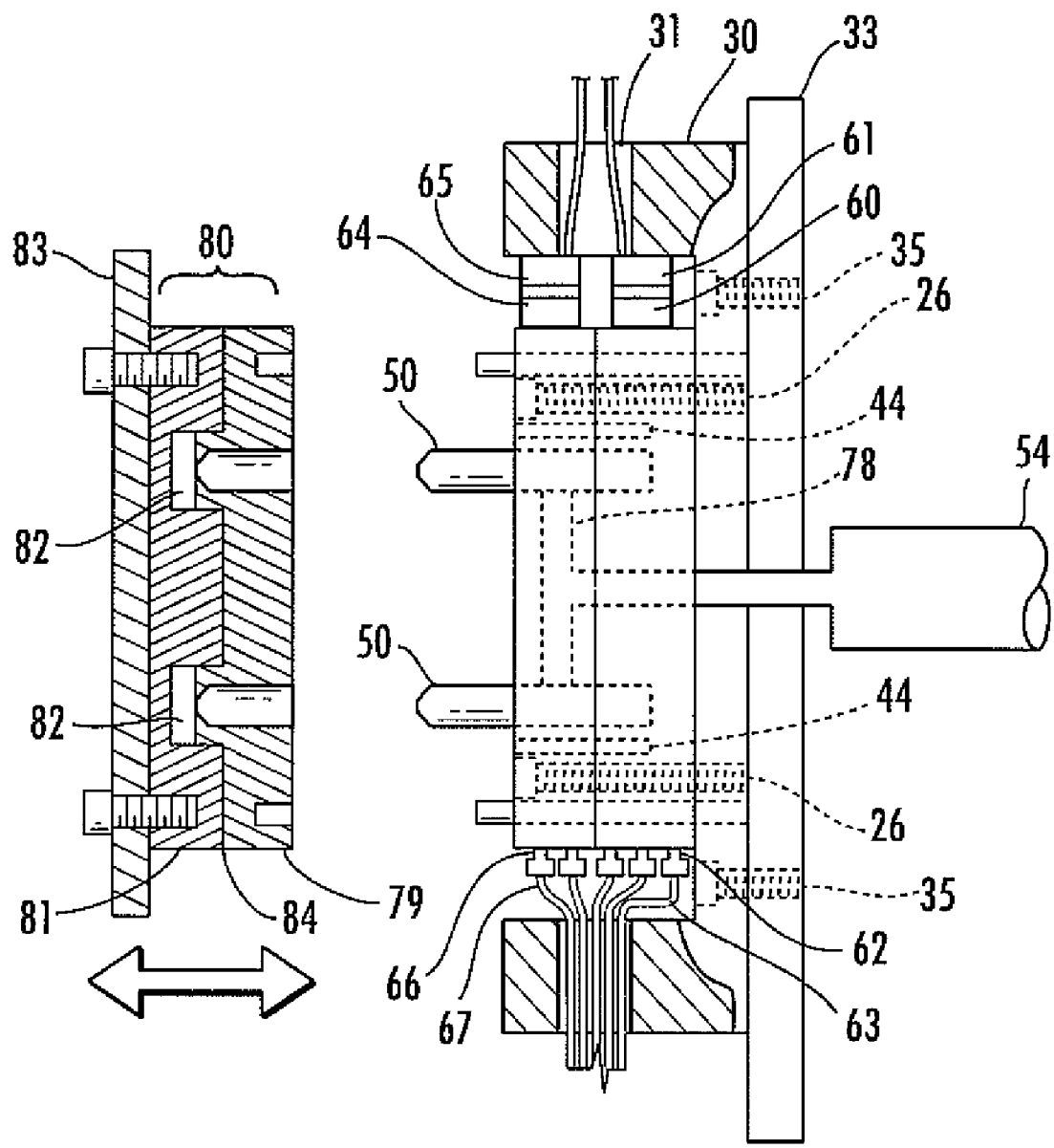
FIG. 4 is a diagrammatic side view similar to FIG. 3, illustrating the hot runner module in spaced relation to the mold module.

Referring to FIGS. 3 and 4, during an injection molding operation, a thermoplastic material may be delivered from the first polymer supply 54 to the first injection nozzles 50 through a molten material distribution channel 78. During the molding procedure, the first injection nozzles 50 project partially across a splittable mold module 80 having a core plate 79 and a cavity plate 81 such that the tips of the first injection nozzles 50 extend to cavities 82 within the mold module 80. When the first injection nozzles 50 are activated, the thermoplastic material is fed into the cavities 82 for solidification. Following solidification, the mold module 80 may be split along fissure line 84 between the core plate 79 and a cavity plate 81 for subsequent removal of the molded part from the cavity 82. Of course, any number of variations may be used as desired.

As illustrated in FIG. 4, the mold module 80 may be moved axially towards and away from the first injection nozzles 50 using a mold plate carrier 83. The mold plate carrier 83 may be mounted on a piston structure, tracks, or other suitable conveyance structures (not shown) so as to permit controlled placement and removal of the mold module 80 relative to the injection nozzles projecting away from the hot runner module. When the mold module 80 is due for replacement, or if the hot runner system 10 requires repair, the mold module 80 may be disconnected from the mold plate carrier 83 and transported away by use of a hoist or other suitable device.

Upon removal of the mold module 80, the first hot runner module 12 is accessible for servicing. As noted previously, according to one contemplated practice, the first hot runner module 12 may be isolated by disconnecting all power and hydraulic supplies at the connection points around the perimeter of the module plates. Once the first hot runner module 12 has been isolated, it may then be withdrawn from the support frame 30 as a modular unit for servicing at a remote location. Such a withdrawal is illustrated in FIG. 5.

As shown, in the exemplary withdrawal procedure, the first module attachment bolts 26 may be removed, thereby eliminating a fixed connection between the first hot runner module 12 and the support frame 30. In addition, module plate connection bolts 86 may be inserted into the first module connection bores 44 to hold the first hydraulic plate 16 together with the first manifold plate 20. As illustrated in FIG. 5, when the first module attachment bolts 26 have been withdrawn, the first hot runner module 12 may be slidingly removed from the support frame 30 by sliding out of engagement with first mounting projection elements 40. The first hot runner module 12 may then be carried to a remote service location by a hoist or other device. This removal permits maintenance to be carried out on the first injection nozzles or other components of the first hot runner module 12 at the remote service location, thereby allowing the hot runner system 10 to continue operation with a replacement module (not shown) during the repair. This ability for on-the-fly replacement may improve the overall productivity of the injection molding system by reducing down time which may occur during on-site maintenance of nozzles or other components.

The supported modular arrangement of hot runner may promote the ability to selectively access and/or withdraw various components and/or plates in a stacked arrangement of a hot runner system. By way of example only, and not limitation, individual injection nozzles can be readily accessed for repair without requiring the removal of any plates. In the event that a manifold plate or other surface plate requires servicing, that surface plate can be selectively pulled away while leaving other plates in place. According to one practice, this selective withdrawal may be effected by running the connection bolts 86 inwardly only to a distance to engage the surface plate without engaging other plates in the stacked arrangement. Once the surface plate is pulled away, it can then be lifted out of the injection molder and a replacement plate can be put in place. Likewise, a hydraulic plate or any other interior plate within the stacked module may be accessed in a similar manner by running the connection bolts 86 inwardly to a distance to engage the interior plate of interest. Thus, the surface plate, the interior plate of interest and any intermediate plates may be selectively pulled away from the support frame 30 thereby providing access to the plate of interest which is at the exterior of the removed portion. The plate of interest can then be selectively lifted out of the injection molder by a hoist and a replacement plate can be put in place without the need to remove other plates within the hot runner module. This removal system is thus adaptable to hot runner systems having any number of stacked plates as may be desired and substantially reduces downtime and complexity associated with repairs.

INDUSTRIAL APPLICABILITY

Modular hot runner systems consistent with the present disclosure may be applicable to virtually any injection molding environment incorporating injection nozzles mounted to a hot runner molten material distribution system. In particular, the present disclosure may find application in injection molding environments requiring high productivity rates using a limited number of injection molding stations to achieve those desired productivity rates. By way of example only, and not limitation, a system incorporating a hot runner system incorporating readily removable hot runner modules supporting one or more injection nozzles may find application in injection molding environments wherein large numbers of relatively intricate parts are manufactured on a repetitive basis. Such repetitive production may be prevalent in the manufacture of components used in large numbers during the construction of articles such as transportation vehicles, appliances, aircraft, and the like.

The use of modular, easily replaceable hot runner systems may substantially reduce down time in the injection molding system by permitting the removal of a damaged hot runner module and the substitution of a replacement hot runner module to permit the molding operation to continue during the repair. Thus, the injection molding system may continue to operate during the repair rather than being idled. This may increase the production capacity of the overall system.

What is claimed is:

1. A hot runner system configured to transport molten material to a mold module having a mold cavity for injection molding, the hot runner system comprising:
    a support frame including a plurality of mounting projection elements extending horizontally away from a substantially vertical support surface; and
    at least one hot runner module adapted for mounting at said support surface, said at least one hot runner module including at least one injection nozzle projecting away from a module surface and adapted for fluid communication with a supply of said molten material, said at least one hot runner module including a plurality of acceptance openings adapted to engage said mounting projection elements such that said mounting projection elements extend at least partially across said at least one hot runner module and are configured to support a weight of said at least one hot runner module.

2. The hot runner system as recited in claim 1, including a plurality of hot runner modules, said plurality of hot runner modules including acceptance openings adapted to engage said mounting projection elements.

3. The hot runner system as recited in claim 1, wherein said at least one hot runner module includes a plurality of injection nozzles projecting away from the module surface.

4. The hot runner system as recited in claim 1, wherein said at least one hot runner module is a multi-section hot runner module including a first plate section disposed in juxtaposed relation to at least a second plate section, said hot runner module including a plurality of module connection bores extending at least partially across said hot runner module, said plurality of module connection bores being adapted to accept elongate fastening elements securing said first plate section to said second plate section.

5. The hot runner system as recited in claim 1, wherein said at least one hot runner module is a multi-section hot runner module including a first plate section disposed in juxtaposed relation to at least a second plate section, said hot runner module including a plurality of frame connection bores adapted to accept module attachment bolts extending across said hot runner module and into said support surface.

6. The hot runner system as recited in claim 1, wherein said support frame has a substantially "C" shaped cross section.

7. The hot runner system as recited in claim 6, wherein said support frame includes a plurality of openings adapted for passage of electrical and hydraulic connection lines.

8. The hot runner system as recited in claim 1, wherein said plurality of acceptance openings adapted to engage said mounting projection elements are disposed at diametrically opposed quadrants of said hot runner module.

9. The hot runner system as recited in claim 1, wherein said mounting projection elements are substantially smooth surface pin elements.

10. The hot runner system as recited in claim 1, wherein said mounting projection elements are characterized by an operative length such that distal ends of said mounting projection elements extend across said at least one hot runner module and beyond said module surface, the mounting projection elements being further configured to align said support frame and said hot runner module to said mold module.

11. A hot runner system configured to transport molten material to a mold cavity of a mold module for injection molding, the hot runner system comprising:
  a support frame including a plurality of mounting projection elements extending horizontally away from a substantially vertical support surface; and
  at least one hot runner module adapted for mounting at said support surface, said at least one hot runner module including a plurality of injection nozzles projecting away from a manifold plate having a molten material distribution channel disposed at least partially within said manifold plate, said at least one hot runner module further including a hydraulic plate adapted to supply hydraulic fluid to said injection nozzles, said hydraulic plate being disposed in juxtaposed relation to said manifold plate, said at least one hot runner module including a first plurality of passages extending through said manifold plate and said hydraulic plate, said first plurality of passages being adapted to slidingly engage said mounting projection elements such that said mounting projection elements extend at least partially across said at least one hot runner module to support a weight of said at least one hot runner module, said at least one hot runner module further including a second plurality of passages extending across said manifold plate and said hydraulic plate with attachment members extending through said second plurality of passages into fixing engagement with said support surface.

12. The hot runner system as recited in claim 11, comprising a plurality of hot runner modules, said plurality of hot runner modules including acceptance openings adapted to engage said mounting projection elements.

13. The hot runner system as recited in claim 11, wherein said support frame has a substantially "C" shaped cross section.

14. The hot runner system as recited in claim 13, wherein said support frame includes a plurality of openings adapted for passage of electrical and hydraulic connection lines.

15. The hot runner system as recited in claim 11, wherein said plurality of acceptance openings adapted to engage said mounting projection elements are disposed at diametrically opposed quadrants of said at least one hot runner module.

16. The hot runner system as recited in claim 11, wherein said mounting projection elements are substantially smooth surface pin elements.

17. The hot runner system as recited in claim 11, wherein said mounting projection elements are characterized by an operative length such that distal ends of said mounting projection elements extend across said at lest one hot runner module and beyond said module surface, the mounting projection elements being further configured to align said support frame and said hot runner module to said mold module.

* * * * *